(12) United States Patent
Xu et al.

(10) Patent No.: US 11,469,481 B2
(45) Date of Patent: Oct. 11, 2022

(54) BATTERY UNIT AND MANUFACTURING METHOD THEREOF, AND BATTERY MODULE

(71) Applicant: Contemporary Amperex Technology Co., Limited, Ningde (CN)

(72) Inventors: Hu Xu, Ningde (CN); Youlei Lai, Ningde (CN); Yuanbao Chen, Ningde (CN); Miaomiao Ren, Ningde (CN); Donglai Zheng, Ningde (CN); Haizu Jin, Ningde (CN)

(73) Assignee: Contemporary Amperex Technology Co., Limited, Fujian (CN)

( * ) Notice: Subject to any disclaimer, the term of this patent is extended or adjusted under 35 U.S.C. 154(b) by 92 days.

(21) Appl. No.: 16/879,920

(22) Filed: May 21, 2020

(65) Prior Publication Data

US 2020/0373547 A1 Nov. 26, 2020

(30) Foreign Application Priority Data

May 24, 2019 (CN) .......................... 201910437844.5

(51) Int. Cl.
*H01M 50/54* (2021.01)
*H01M 4/70* (2006.01)
*H01M 10/04* (2006.01)

(52) U.S. Cl.
CPC ............. *H01M 50/54* (2021.01); *H01M 4/70* (2013.01); *H01M 10/045* (2013.01)

(58) Field of Classification Search
CPC ....... H01M 50/54; H01M 4/70; H01M 10/045
See application file for complete search history.

(56) References Cited

U.S. PATENT DOCUMENTS

| 9,287,550 B2 | 3/2016 | Kim et al. | |
| 2012/0251874 A1* | 10/2012 | Guen | H01M 50/54 429/179 |
| 2013/0330593 A1* | 12/2013 | Kim | H01M 50/531 429/149 |
| 2016/0218401 A1* | 7/2016 | Hermann | H01M 50/531 |
| 2019/0067665 A1 | 2/2019 | Jang | |

(Continued)

FOREIGN PATENT DOCUMENTS

| CN | 103490039 A | 1/2014 |
| CN | 105762322 A | 7/2016 |
| CN | 106159179 A | 11/2016 |

(Continued)

*Primary Examiner* — Jimmy Vo
(74) *Attorney, Agent, or Firm* — Sterne, Kessler, Goldstein & Fox P.L.L.C.

(57) ABSTRACT

A battery unit includes: an electrode assembly, including a main body portion, and a negative tab and a positive tab, which respectively extend out from both ends of the main body portion along the length direction; a negative terminal and a positive terminal, arranged at the top of the electrode assembly; a first current collector for electrically connecting the negative tab with the negative terminal; and a second current collector for electrically connecting the positive tab with the positive terminal. The first current collector includes a first guiding plate. The first guiding plate is of a flat plate structure, and the negative tab is bent to one side of the first guiding plate away from the main body portion and is connected with the first guiding plate.

18 Claims, 7 Drawing Sheets

(56) References Cited

U.S. PATENT DOCUMENTS

2019/0221821 A1 7/2019 Xing et al.
2020/0243896 A1 7/2020 Zhang et al.

FOREIGN PATENT DOCUMENTS

| CN | 108258180 A | 7/2018 |
| CN | 208014793 U | 10/2018 |
| CN | 111106300 A | 5/2020 |
| EP | 3 451 416 A1 | 3/2019 |

* cited by examiner

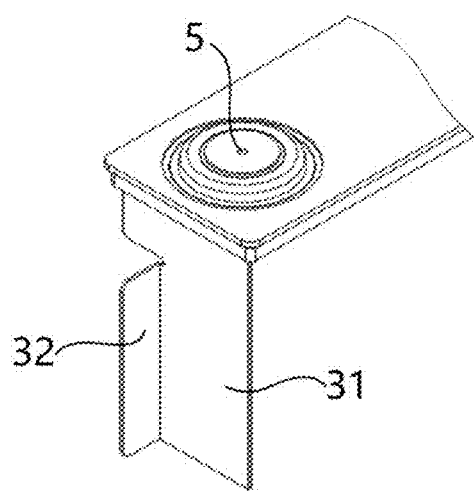
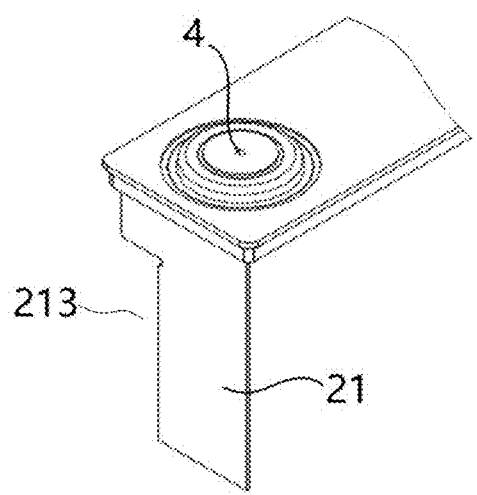
Fig. 13A
Fig. 13B

BATTERY UNIT AND MANUFACTURING METHOD THEREOF, AND BATTERY MODULE

CROSS-REFERENCE TO RELATED APPLICATION

The present application claims priority of Chinese application No. 201910437844.5, filed on May 24, 2019. The disclosed content of the Chinese application is hereby entirely incorporated into the present disclosure by reference thereto.

FIELD OF THE DISCLOSURE

The present disclosure relates to the technical field of batteries, and in particular, to a battery unit and a manufacturing method thereof, and a battery module.

BACKGROUND OF THE DISCLOSURE

In recent years, rechargeable batteries have been widely used for providing power for high-power devices, such as electric vehicles and the like. The rechargeable batteries achieve greater capacity or power by connecting a plurality of battery units in series or in parallel.

The existing battery unit is provided with an electrode assembly in the shell, the electrode assembly is formed by superposing and winding a positive pole piece, a diaphragm and a negative pole piece, and each of the positive pole piece and the negative pole piece includes a coated portion and an uncoated portion, the uncoated portion forms a tab, the tabs on both sides of the electrode assembly are respectively connected with positive and negative terminals at the top of the shell through current collectors.

SUMMARY OF THE DISCLOSURE

According to one aspect of the present disclosure, a battery unit is provided, including:

an electrode assembly, including a main body portion, a negative tab and a positive tab, wherein the negative tab and the positive tab respectively extend out from both ends of the main body portion along a length direction of the electrode assembly;

a negative terminal and a positive terminal, arranged at the top of the electrode assembly; and a first current collector and a second current collector, wherein the first current collector electrically connects the negative tab with the negative terminal, and the second current collector electrically connects the positive tab with the positive terminal;

wherein the first current collector includes a first guiding plate, the first guiding plate is of a flat plate structure, the first guiding plate is located on one side of the main body portion adjacent to the negative terminal along the length direction and extends along a width direction of the electrode assembly, and the negative tab is bent to one side of the first guiding plate away from the main body portion and is connected with the first guiding plate.

In some embodiments, the battery unit includes two electrode assemblies, wherein the negative tab of one electrode assembly is led out from one side of the main body portion away from the other electrode assembly along the width direction, and the negative tabs of the two electrode assemblies are bent towards each other along the width direction.

In some embodiments, the second current collector includes a second guiding plate, the second guiding plate is of a flat plate structure, the second guiding plate is located on one side of the main body portion adjacent to the positive terminal along the length direction and extends along the width direction, and the positive tab is bent to one side of the second guiding plate away from the main body portion and is connected with the second guiding plate.

In some embodiments, the second current collector includes a second guiding plate and a supporting plate, the second guiding plate is located on one side of the main body portion adjacent to the positive terminal along the length direction and extends along the width direction, the supporting plate is connected to an end of the second guiding plate along the width direction, and the positive tab is connected to the supporting plate from the outer side and is entirely bent to one side of the second guiding plate away from the main body portion.

In some embodiments, supporting plates are arranged on both ends of the second guiding plate along the width direction, and the two supporting plates are bent towards each other.

In some embodiments, the supporting plate offsets inward for a predetermined distance with respect to the edge of the end of the second guiding plate along the width direction; and/or the edge of a free end of at least one of the first guiding plate and the second guiding plate along the width direction offsets inward for a predetermined distance on at least partial height, so as to form a first notch, and the negative tab or the positive tab passes through the first notch.

In some embodiments, the second current collector further includes a second adapter plate, the positive terminal is fixed to the second adapter plate, a side of the supporting plate adjacent to the second adapter plate and the second adapter plate are arranged at intervals, and a second notch is formed at an end of a connection portion of the second guiding plate and the supporting plate adjacent to the second adapter plate.

In some embodiments, both of the negative tab and the positive tab are of layered structures; and the negative tab includes a first connecting portion and a first collecting portion, the first connecting portion is located on one side of the first guiding plate away from the main body portion along the length direction and is connected to the first guiding plate, the first collecting portion is located on one side of the first guiding plate adjacent to the main body portion along the length direction, and the first guiding plate is attached to the first collecting portion.

In some embodiments, the first guiding plate includes a substrate layer, and the substrate layer is attached to the first collecting portion; or the first guiding plate includes a substrate layer and an insulating layer, the insulating layer is attached to one side of the substrate layer adjacent to the first collecting portion, and the insulating layer is attached to the first collecting portion.

In some embodiments, each layer of the first connecting portion is integrally formed by ultrasonic welding and forms a first fusion area, the first connecting portion and the first guiding plate are fixed by laser welding and form a second fusion area, in a plane perpendicular to the length direction, the projection of the second fusion area is completely located in a projection area of the first fusion area.

In some embodiments, the hardness of the first current collector is greater than the hardness of the second current collector.

According to another aspect of the present disclosure, a battery module is provided, including:

a fixing frame; and a plurality of battery units in the above embodiments, arranged in the fixing frame and arranged side by side along the width direction.

According to another aspect of the present disclosure, a manufacturing method of the battery unit based on the above embodiment is provided, including:

preparing the electrode assembly;

fixing the negative terminal and the positive terminal to the first current collector and the second current collector respectively;

bending the negative tab and connecting the same with the first guiding plate; and bending the positive tab and connecting the same with the second current collector.

In some embodiments, the step of bending the negative tab and connecting the same with the first guiding plate includes:

making each piece of the negative tabs form an entirety through ultrasonic welding;

bending the welded negative tab to one side of the first guiding plate away from the main body portion, and attaching the negative tabs to the first guiding plate; and performing laser welding on the negative tab and the first guiding plate from the outer side of the negative tab.

In some embodiments, the step of bending the negative tab and connecting the same with the first guiding plate includes:

placing a side of the main body portion perpendicular to the width direction in parallel with the first guiding plate, and attaching an inner side of the negative tab to an outer side of the first guiding plate;

placing a supporting member on the inner side of the first guiding plate;

performing ultrasonic welding on the negative tab and the first guiding plate from the outer side of the negative tab; and rotating the main body portion by 90° around the root of the negative tab to bend the negative tab after welding.

In some embodiments, the second current collector includes a second guiding plate and a supporting plate, the supporting plate is connected to the end of the second guiding plate along the width direction, and the step of bending the positive tab and connecting the same with the second current collector includes:

placing a supporting member on the inner side of the supporting plate;

performing ultrasonic welding on the positive tab and the supporting plate from the outer side of the positive tab; and bending the entirety of the welded positive tab and the supporting plate to one side of the second guiding plate away from the main body portion.

In some embodiments, the negative tab and the first guiding plate are ultrasonically welded, and the welding step of the negative tab is performed before the welding step of the positive tab.

In some embodiments, the second current collector includes a second guiding plate, the positive tab is of a flat plate structure, and the positive tab is bent to one side of the second guiding plate away from the main body portion and is fixedly connected with the second guiding plate;

laser welding is performed between the negative tab and the first guiding plate and between the positive tab and the second guiding plate; or the laser welding is performed on one of the locations between the negative tab and the first guiding plate and between the positive tab and the second guiding plate, the ultrasonic welding is performed on the other one, and the ultrasonic welding is performed before the laser welding.

BRIEF DESCRIPTION OF THE ACCOMPANYING DRAWINGS

The drawings illustrated herein are used for providing a further understanding of the present disclosure and constitute a part of the present application, and the illustrative embodiments of the present disclosure and the descriptions thereof are used for explaining the present disclosure and do not constitute an undue limitation to the present disclosure. In the drawings:

FIG. 13A and FIG. 13B are respectively structural diagrams of some embodiments of the second current collector and the first current collector in the battery unit of the present disclosure.

Figure 1:
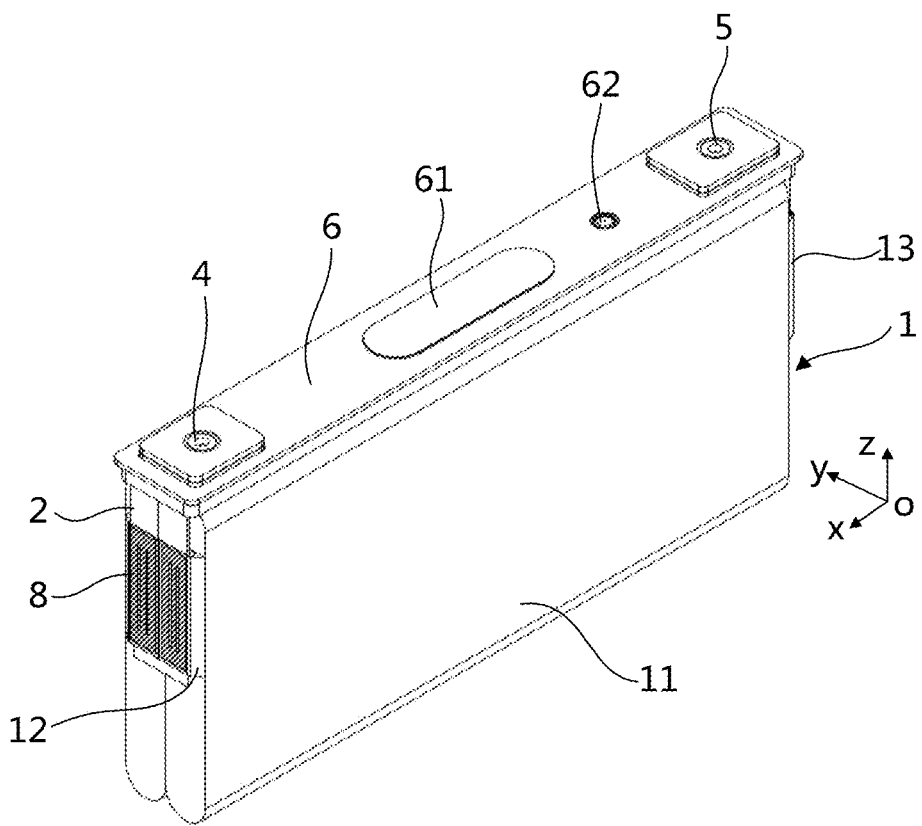
FIG. 1 is a schematic diagram of an internal structure of some embodiments of a battery unit of the present disclosure.

REFERENCE SIGNS 1, electrode assembly; 11, main body portion; 12, negative tab; 121, first connecting portion; 122, first collecting portion; 13, positive tab; 131, second connecting portion; 132, second collecting portion; 2, first current collector; 21, first guiding plate; 211, substrate layer; 212, insulating layer; 213, first notch; 3, second current collector; 31, second guiding plate; 311, second notch; 32, supporting plate; 33, second adapter plate 4, negative terminal; 5, positive terminal; 6, cover plate; 61, exhaust member; 62, liquid injection hole; 7, insulating plate; 8, protective sheet.

DETAILED DESCRIPTION OF THE PREFERRED EMBODIMENTS

The present disclosure is described in detail below. In the following paragraphs, different aspects of the embodiments are defined in more detail. Aspects so defined can be combined with any other one or more aspects, unless clearly indicated that they are not combinable. In particular, any feature that is considered to be preferred or advantageous can be combined with the other one or more features that are considered to be preferred or advantageous.

The terms "first", "second" and the like appearing in the present disclosure are merely for the convenience of description to distinguish different components having the same name, and do not indicate a sequential or primary and secondary relationship.

In addition, when an element is referred to as being "on" another element, the element can be directly on the other element, or can be indirectly on the other element and one or more intermediate elements are inserted therebetween. In addition, when an element is referred to be "connected to" another element, the element can be directly connected to the other element or can be indirectly connected to the other element and one or more intermediate elements are inserted therebetween. The same reference sign denotes the same element below.

In order to clearly describe various orientations in the following embodiments, for example, various directions of a battery unit are defined in a coordinate system in FIG. 1, an x direction represents the length direction of the battery unit; an y direction is perpendicular to the x direction in the horizontal plane, and represents the width direction of the battery unit; an z direction is perpendicular to a plane formed by the x and y directions, and represents the height direction of the battery unit. The direction definition of the electrode assembly 1 is the same as that of the battery unit. Based on this orientation definition, the description of orientation or positional relationships indicated by "upper", "lower", "top", "bottom", "front", "back", "inside" and "outside" is used for the convenience of describing the present disclosure only, rather than indicating or implying that the device referred to must have a specific orientation, be constructed and operated in a specific orientation, and therefore should not be construed as limiting the protection scope of the present disclosure.

In the related art known to the inventors, for the convenience of welding, the current collectors on the both sides of the electrode assembly are provided with supporting plates connected with the tabs, and the entirety is bent after the tabs are welded with the supporting plates. However, greater spaces are occupied on the both sides of the electrode assembly in this manner of connecting the current collectors with the tabs, and in the case that the volume of the battery unit is constant, the winding space is reduced, thereby reducing the energy density of the battery.

Embodiments of the present disclosure provide a battery unit and a manufacturing method thereof, and a battery module, which can effectively improve the energy density of a battery.

According to the above technical solutions, in the battery unit of some embodiments of the present disclosure, the first guiding plate of the first current collector is of the flat plate structure, and the negative tab is connected with the first guiding plate after bending, so that the space occupied by a connecting portion of the negative tab and the first current collector on one side of the main body portion along the length direction can be reduced, the winding space can be increased, and the energy density of the battery unit can be improved; and furthermore, the negative tab with lower hardness is singly folded back and connected with the first guiding plate, so that an external force applied on the negative tab in a bending process can be reduced, the deformation of the first guiding plate can be reduced, the electrochemical performance and safety performance of the battery unit can be ensured, and the electrode assembly can be smoothly assembled in a shell.

In order that those skilled in the art can understand the improvements of the present disclosure more clearly, the overall structure of the battery module and the battery unit will be described at first.

When the battery module is formed by a plurality of battery units, the battery module includes a fixing frame and a plurality of battery units, the battery units are arranged in the fixing frame and are arranged side by side along the width direction, and can be connected in at least one of parallel and series, and each of the battery units can be provided with a shell separately, or the shell is omitted. Or, the battery units can also be used alone.

FIG. 1 schematically shows a structural schematic diagram of some embodiments of a battery unit of the present disclosure. The battery unit may include an electrode assembly 1, a cover plate 6, two terminals and two current collectors. When the battery unit is used alone, a shell connected with the cover plate 6 is also arranged at the outside of the electrode assembly 1, and the shell is filled with electrolyte.

There is only one electrode assembly 1 on the width direction of the battery unit, or a plurality of electrode assemblies 1 are superposed, and the electrode assembly 1 includes a main body portion 11, a negative tab 12 and a positive tab 13, wherein the negative tab 12 and the positive tab 13 respectively extend out from both ends of the main body portion 11 along the length direction. Specifically, the main body portion 11 is a coated portion, including a first electrode and a second electrode with opposite polarities, for example, the first electrode is a positive electrode and the second electrode is a negative electrode. The negative tab 12 and the positive tab 13 are uncoated portions, both of the negative tab 12 and the positive tab 13 are made of aluminum and are of layered structures.

There is only a single electrode assembly 1 in the battery unit, which is suitable for the situation in which the lamination thickness of electrode layers is relatively small. Or, as shown in FIG. 1, when the lamination thickness of the electrode layers is relatively large, two or more independently wound electrode assemblies 1 can also be arranged in the battery unit, and all the tabs of the electrode assemblies 1 are respectively led out from the both sides of the current collector along the width direction.

The cover plate 6 is arranged at the top of the electrode assembly 1, and the cover plate 6 is provided with an exhaust member 61 and a liquid injection hole 62, the exhaust member 61 is used for releasing a gas in the battery unit to achieve a safety role, the liquid injection hole is used for injecting electrolyte into the battery unit and is sealed by a sealing member. The two terminals are arranged at both ends of the top of the cover plate 6 along the length direction, and include a negative terminal 4 and a positive terminal 5. An insulating plate 7 is arranged at the bottom of the cover plate 6 to insulate the cover plate 6 from the electrode assembly 1, so as to improve the insulating performance in the battery unit.

The two current collectors include a first current collector 2 and a second current collector 3, the first current collector 2 electrically connects the negative tab 12 with the negative terminal 4, and the second current collector 3 electrically connects the positive tab 13 with the positive terminal 5.

Based on the overall structure of the battery unit given above, the improvements of the present disclosure will be further illustrated below.

Figure 2:
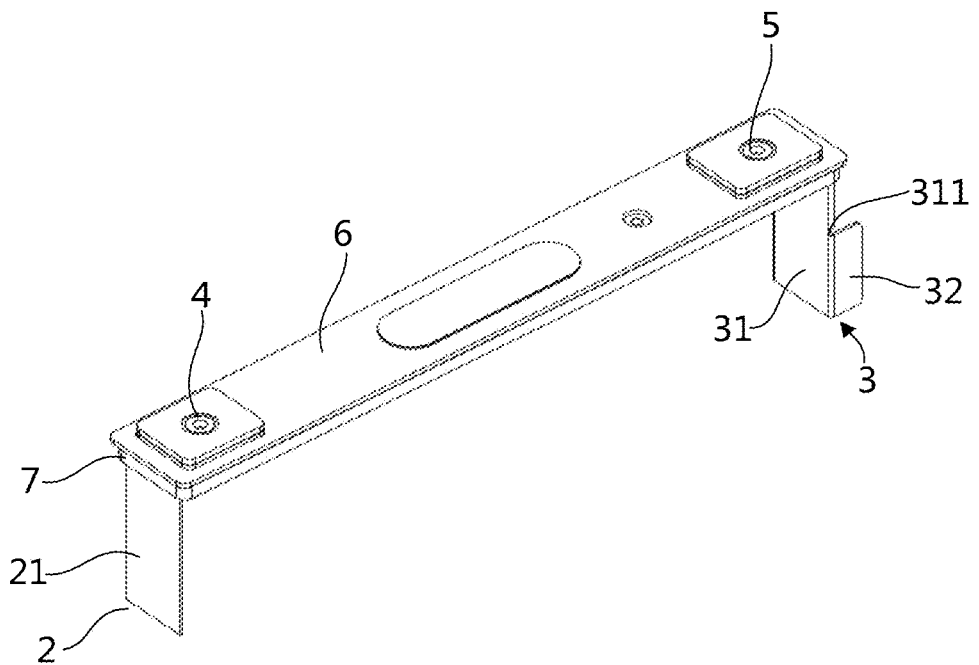
FIG. 2 is a structural schematic diagram of some embodiments of a top cover assembly in the battery unit of the present disclosure.

In some embodiments, as shown in FIG. 1 and FIG. 2, the first current collector 2 includes a first guiding plate 21 and a first adapter plate, the first adapter plate is connected to a top end of the first guiding plate 21, so that the first current collector 2 is integrally formed an L-shaped structure, and the negative terminal 4 is fixed on the first adapter plate. The first guiding plate 21 is of a flat plate structure, the first guiding plate 21 is located on one side of the main body portion 11 adjacent to the negative terminal 4 along the length direction and extends along the width direction, the negative tab 12 is bent to one side of the first guiding plate 21 away from the main body portion 11, an outer side face of the first guiding plate 21 is in contact with a folded back portion of the negative tab 12, and the negative tab 12 is connected with the first guiding plate 21, for example, the negative tab 12 and the first guiding plate 21 are fixed by welding. In a welding process, in order to prevent damage to the tabs, a protective sheet 8 can be arranged on an outer surface of the outermost tab.

In the embodiment of the present disclosure, the first current collector 2 is of the flat plate structure, and the negative tab 12 is connected with the first guiding plate 21 after bending, so that the space occupied by a connecting portion of the negative tab 12 and the first current collector 2 on one side of the main body portion 11 along the length direction can be reduced, and the winding space can be increased, thereby effectively improving the energy density of the battery unit, and improving the power of the battery unit. Or, the overall size of the battery unit can be reduced in the case that the size of the electrode assembly 1 is constant. Moreover, when a plurality of flat plates are cut from a plate and are bent to form the first current collector 2, the utilization rate of the plate can be improved, and the cost can be reduced.

Moreover, since the first current collector 2 is generally made of the same material as the negative terminal 4, such as copper, the material hardness thereof is relatively high, with respect to the structure in which supporting plates are arranged on both ends of the first guiding plate of the negative electrode current collector along the width direction in the prior art, in the process of bending the negative tabs on the both sides together with the supporting plates, the applied external force causes relatively serious deformation to the first guiding plate, if the first guiding plate is concavely deformed toward the main body portion, the pressure is transmitted to at least part of pole pieces in the main body portion, which causes easy demolding or powder drop of the pole pieces coated with active substance due to a mechanical force, thereby affecting the electrochemical performance and the safety performance of the battery unit; and if the first guiding plate is convexly deformed toward the direction away from the main body portion, the assembly of the battery unit is affected.

In the embodiment of the present disclosure, when the negative tab 12 is bent, the negative tab 12 with lower hardness is directly folded back and is connected to the first guiding plate 21, and the bending of the supporting plate is not involved, so that the external force to be applied in the bending process can be reduced, the deformation of the first guiding plate 21 of the first current collector 2 is reduced, the electrochemical performance and the safety performance of the battery unit are ensured, furthermore, the first guiding plate 21 is prevented from protruding outward, and the electrode assembly can be smoothly assembled in the shell.

As shown in FIG. 1, the battery unit includes two electrode assemblies 1, the negative tab 12 of one electrode assembly 1 is led out from one side of the main body portion 11 away from the other electrode assembly 1 along the width direction, and the negative tabs 12 of the two electrode assemblies 1 are bent towards each other along the width direction.

When the winding thickness of the electrode assembly 1 is relatively large, the size of the circular arc at the bottom is relatively large, which will result in a low space utilization rate of the electrode assembly 1 on the outer sides of the circular arcs on the both sides of the bottom, if the electrode assembly is split into two electrode assemblies 1, the size of the circular arc can be reduced, the bottom space of the battery unit is fully utilized, the space waste is reduced, and the energy density of the battery core is increased. Moreover, the total thickness of the tabs is also reduced, which also facilitates the welding and the bending, and the length of a single tab can be reduced. In addition, the risk of inserting the innermost tab into the main body portion 11 due to the long detour distance can also be reduced.

Figure 11:
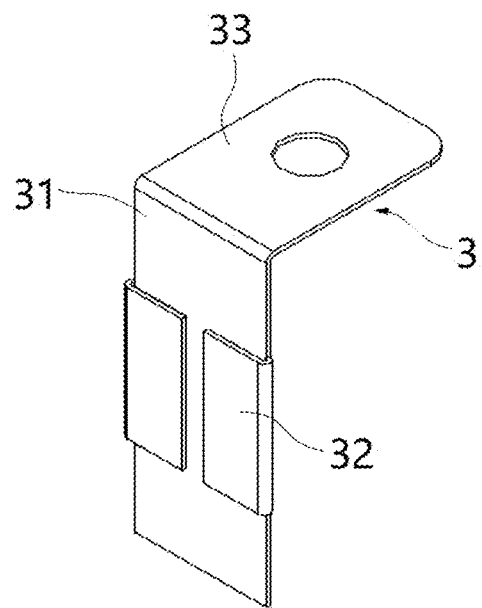
FIG. 11 is a structural diagram of some embodiments of the second current collector in the battery unit of the present disclosure.

In some embodiments, as shown in FIG. 11, the second current collector 3 includes a second guiding plate 31 and a second adapter plate 33, the second adapter plate 33 is connected to the top end of the second guiding plate 31 to form an L-shaped structure, and the positive terminal 5 is fixed on the second adapter plate 33. The second guiding plate 31 is also of the flat plate structure, the second guiding plate 31 is located on one side of the main body portion 11 adjacent to the positive terminal 5 along the length direction and extends along the width direction, the positive tab 13 is bent to one side of the second guiding plate 31 away from the main body portion 11 and is connected with the second guiding plate 31, for example, the positive tab 13 and the second guiding plate 31 can be fixed by welding.

In the embodiment of the present disclosure, the second current collector 3 is also of the flat plate structure, so that the space occupied by the connecting portion of the positive tab 13 and the second current collector 3 at the other side of the main body portion 11 along the length direction can be reduced, and the reduced thickness is the thickness of the supporting plate. By setting both the first current collector 2 and the second current collector 3 as the flat plate structures, the winding space can be further increased, thereby the energy density of the battery unit can be effectively improved.

Moreover, the second current collector 3 is generally made of the same material as the positive terminal 5, such as aluminum, although the material hardness is relatively low, in the process of bending the positive tabs on the both sides together with the supporting plate, slight deformation may also be generated; or, the second current collector 3 can also be made of a material with higher hardness. When the positive tab 13 is bent in the present embodiments, the positive tab 13 can be folded back singly without involving the bending of the supporting plate, so that the requirements for the hardness of the material of the second current collector 3 can be reduced, the deformation of the second guiding plate 31 of the second current collector 3 can be reduced, the electrochemical performance and the safety performance of the battery unit are further ensured, furthermore, the second guiding plate 31 is prevented from protruding outward, and the electrode assembly 1 can be smoothly assembled in the shell.

In addition, the first current collector 2 and the second current collector 3 adopt the same structure, in the procedure of bending the tab and fixing the same with the guiding plate, the same process method can be adopted. For example, when the tab and the guiding plate are fixed by welding, the same process can be adopted, thereby the process flow can be simplified, and the manufacturing difficulty of the battery unit can be reduced.

In some other embodiments, when the hardness of the second current collector 3 is lower than the hardness of the first current collector 2, as shown in FIG. 2 and FIG. 11, the second current collector 3 includes a second guiding plate 31, a second adapter plate and a supporting plate 32, the second guiding plate 31 is located on one side of the main body portion 11 adjacent to the positive terminal 5 along the length direction and extends along the width direction, the supporting plate 32 is connected to the end of the second guiding plate 31 along the width direction, and the positive tab 13 is connected to the supporting plate 32 from the outer side and is entirely bent to one side of the second guiding plate 31 away from the main body portion 11. After the positive tab 13 is folded back, the positive tab 13 covers the supporting plate 32 on the width direction, and the both ends of the supporting plate 32 on the height direction can extend or be flush with the positive tab 13.

Wherein, the second guiding plate 31, the second adapter plate 33 and the supporting plate 32 are integrally formed, and this structure can reduce the processing difficulty and improve the structural strength.

In the present embodiments, considering that the hardness of the material of the second current collector 3 is relatively low, in the bending process of the positive tab 13 together with the supporting plate 32, the amount of deformation is relatively small, and the influence on the electrochemical performance, the safety performance and the assembly of the battery unit is also relatively small, therefore, the second current collector 3 with the supporting plate 32 is still employed. The advantage of this structure is that a supporting member can be easily arranged on the inner side of the supporting plate 32, the supporting plate 32 and the positive tabs 13 can be ultrasonically welded together by applying a pre-pressure before bending, so that the firmness of connecting the supporting plate 32 and the positive tabs 13 can be improved.

Figure 3:
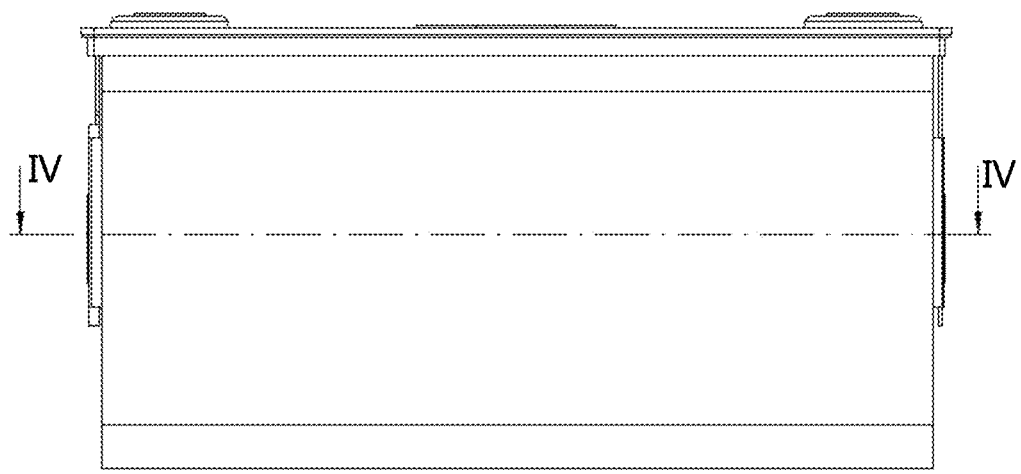
FIG. 3 is a front view of some embodiments of the battery unit of the present disclosure.
Figure 4:
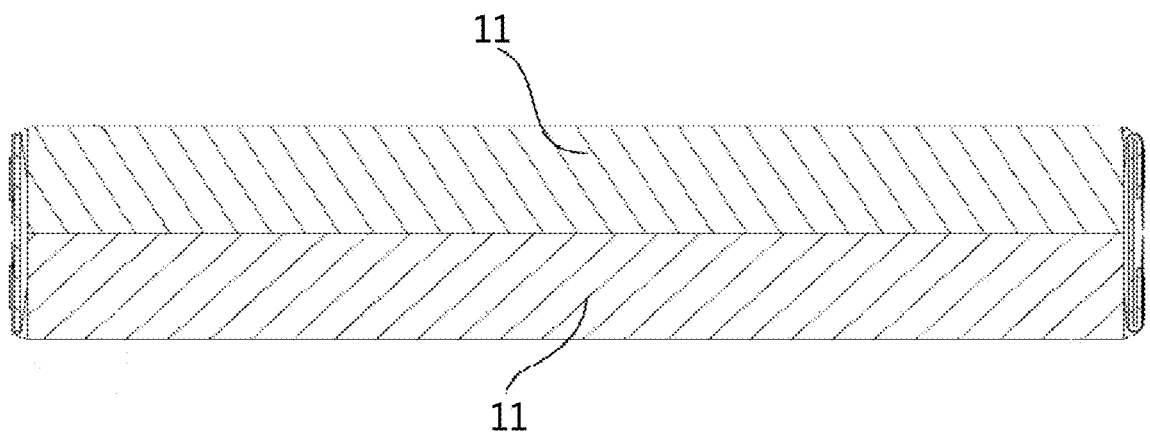
FIG. 4 is an IV-IV section view in FIG. 3.

As shown in FIG. 3 and the Iv-Iv section view shown in FIG. 4, supporting plates 32 are arranged on the both ends of the second guiding plate 31 along the width direction, and the two supporting plates 32 are bent towards each other. In this structure, the positive tabs 13 on the both sides along the width direction and the second current collector 3 can adopt the same connecting and bending methods, so that the process flow can be simplified, and the manufacturing difficulty of the battery unit can be reduced.

As shown in FIG. 2, the supporting plate 32 can be arranged to form an included angle with the second guiding plate 31 in an unfolded back state, for example, arranged to form 90°, and the positive tabs 13 corresponding to two electrode assemblies 1 are attached to the outer sides of the supporting plate 32. The positive tabs 13 and the supporting plates 32 need to be fixedly connected with each other at first by welding or other manners, and then are folded back entirely, so that the supporting plates 32 are fitted with the second guiding plate 31. In the process of bending the positive tabs 13 on the both sides together with the supporting plates 32 towards each other, forces need to be applied to the outer sides of the supporting plates 32 via rollers at first to gradually fold back the same, after the supporting plates 32 are substantially folded back in place, a side of the second guiding plate 31 away from the main body portion 11 of the electrode assembly is placed upward, and the positive tabs 13 on the both sides are flattened by a flat plate tool, and the flat plate tool covers the area corresponding to the two positive tabs 13.

FIG. 3 is a front view of the battery unit as shown in FIG. 1, and FIG. 4 is a section view of FIG. 3, which shows a structural schematic diagram after the tab is folded back. The battery unit includes two electrode assemblies 1, and the tabs of the two electrode assemblies 1 are respectively led out from the both sides of the two main body portion 11 as a whole along the width direction. The first guiding plate 21 of the first current collector 2 adopts the flat plate structure and without supporting plate, the negative tabs 12 on the both sides are bent to one side of the first guiding plate 21 away from the main body portion 11 and are bent towards each other, and the negative tabs 12 are connected with the first guiding plate 21. The supporting plates 32 are arranged on the both ends of the second guiding plate 31 of the second current collector 3 along the width direction, the positive tabs 13 on the both sides are connected with the corresponding supporting plates 32 from the outer sides, and the positive tabs 13 on the both sides are bent to one side of the first guiding plate 21 away from the main body portion 11 and are bent towards each other.

The tabs on the same side of the main body portion 11 along the length direction have no overlapping portion on the width direction after being folded back, and ends of the two tabs may contact with each other or have a gap after being folded back. This structure makes the tabs on the both sides of the main body portion 11 along the width direction be independent from each other, and the space occupied by the connecting portion of the tab and the current collector on the length direction can be further reduced to increase the winding space and to improve the energy density of the battery.

In some embodiments, one end of the second guiding plate 31 along the width direction is provided with the supporting plate 32, the positive tab 13 on the side provided with the supporting plate 32 is attached to the outer side of the supporting plate 32, and the positive tab 13 and the supporting plate 32 are entirely folded back after being fixed with each other by welding or other manners, so that the supporting plate 32 is attached to the second guiding plate 31; the positive tab 13 on the side without the supporting plate 32 is directly bent to one side of the second guiding plate 31 away from the main body portion 11 and is connected with the second guiding plate 31. This structure can reduce the partial space occupied by the connecting structure of the positive tab 13 and the second current collector 3 on the length direction, and the electrode assembly 1 can be set as a partially protruding structure along the length direction to further improve the energy density of the battery unit.

As shown in FIG. 13A, if the tab is relatively thick, and the second current collector 3 includes the supporting plate 32, the root of the supporting plate 32 offsets inward for a predetermined distance with respect to the edge of the end part of the second guiding plate 31 along the width direction. This structure is suitable for the battery units having one or more electrode assemblies 1.

In the present embodiments, when the lamination thickness of the positive tabs 13 is relatively large, the positive tabs 13 can be easily bent, and the covering length when the positive tabs 13 bypass the supporting plates 32 can be reduced, thereby reducing the total length of the positive tabs 13 and saving the material. Moreover, it is conducive to attach the positive tabs 13 to the supporting plates 32, thereby further reducing the size of the battery unit on the length direction.

As shown in FIG. 13B, if the tab is relatively thick, with respect to the end of the first guiding plate 21 and the second guiding plate 31 provided with no supporting plate 32, the edge of a free end of at least one of the first guiding plate 21 and the second guiding plate 31 along the width direction offsets inward for a predetermined distance on at least partial height, so as to form a first notch 213, and the negative tab 12 or the positive tab 13 passes through the first notch 213. For example, the first notch 213 can be rectangular.

In the present embodiments, when the lamination thickness of tab layers is relatively large, the tabs can be easily bent, and the covering length when the tabs bypass the guiding plates can be reduced, the roots of the tabs do not need to be bent to form an circular arc-shaped structure, but a slope-shaped structure is formed, so that the total length of the tabs can be reduced, and the material is saved. Moreover, it is conducive to attach the tabs with the guiding plate, thereby further reducing the size of the battery unit along the length direction.

As shown in FIG. 2, the second current collector 3 further includes a second adapter plate 33, the positive terminal 5 is fixed on the second adapter plate 33, a top face of the supporting plate 32 and the second adapter plate 33 are arranged at interval, and a second notch 311 is formed at an end of a connection portion of the second guiding plate 31 and the supporting plate 32, that is a second notch 311 is formed at the top of the connection portion of the second guiding plate 31 and the supporting plate 32. By providing the second notch 311, the positive tab 13 and the supporting plate 32 can be folded back easily after being welded, and stress concentration at the bent portion can be prevented in the folded back state to prevent cracking. For example, the second notch 311 can be a process hole formed by stamping.

Figure 5A:
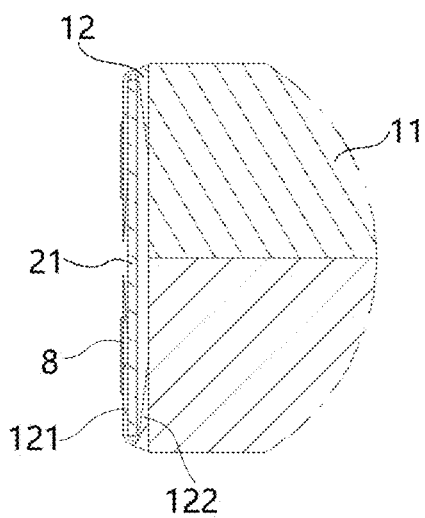
FIG. 5A and FIG. 5B are respectively enlarged views of a location B and a location C in FIG. 4.

In some embodiments, in an enlarged view of a location B as shown in FIG. 5A, the negative tab 12 is of a layered structure, the negative tab 12 includes a first connecting portion 121 and a first collecting portion 122, the first connecting portion 121 is located on one side of the first guiding plate 21 is away from the main body portion 11 along the length direction and is fixedly connected with the first guiding plate 21, the first collecting portion 122 is located on one side of the first guiding plate 21 adjacent to the main body portion 11 along the length direction, and the first guiding plate 21 is attached to the first collecting portion 122.

This structure can further reduce the space occupied by the connecting portion of the tab and the current collector on the side of the main body portion 11, and can increase the winding space, thereby effectively improving the energy density of the battery unit.

Figure 12:
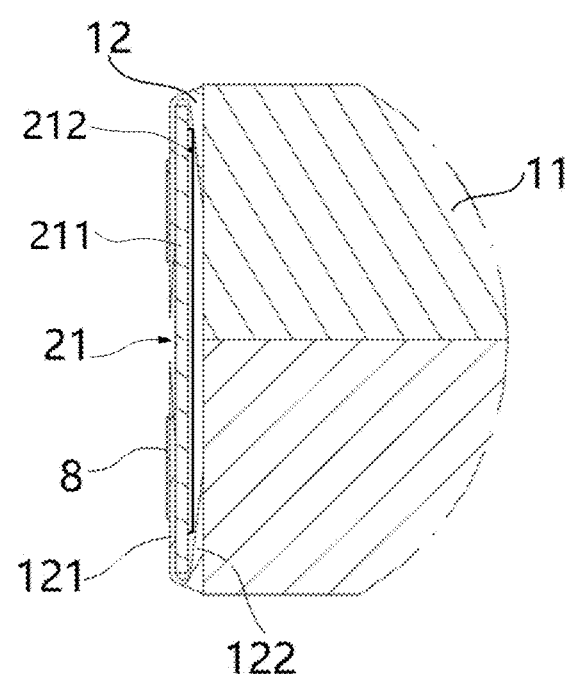
FIG. 12 is a structural diagram of the connection of the first current collector and the negative tab in the battery unit of the present disclosure.

As shown in FIG. 12, the negative tab 12 is led out starting from an intermediate position of the main body portion 11 of the single electrode assembly 1 along the width direction, since the first guiding plate 21 is attached to the first collecting portion 122, in order to improve the insulation between the first guiding plate 21 and the main body portion 11, the first guiding plate 21 includes a substrate layer 211 and an insulating layer 212, the insulating layer 212 is attached to one side of the substrate layer 211 adjacent to the first collecting portion 122, and the insulating layer 212 is attached to the first collecting portion 122. For example, the insulating layer 212 can be attached to the substrate layer by bonding.

As shown in FIG. 5A, on the basis of ensuring the insulation between the first guiding plate 21 and the main body portion 11, the first guiding plate 21 includes a substrate layer 211, no insulating layer is attached to the substrate layer 211, and the substrate layer 211 is directly attached to the first collecting portion 122.

Figure 5B:
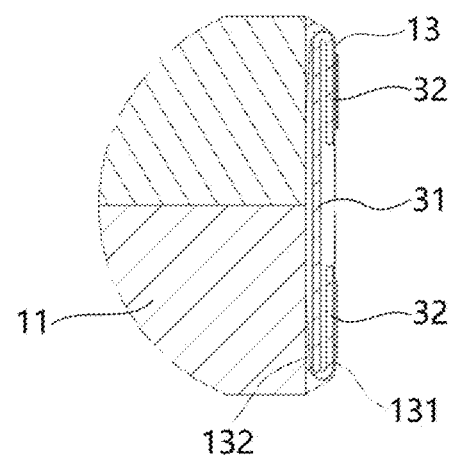

In some embodiments, in the enlarged view of a location C as shown in FIG. 5B, the positive tab 13 is of the layered structure, the positive tab 13 includes a second connecting portion 131 and a second collecting portion 132, the second connecting portion 131 is located on one side of the second guiding plate 31 away from the main body portion 11 along the length direction and is fixedly connected with the supporting plate 32, the second collecting portion 132 is located on one side of the second guiding plate 31 adjacent to the main body portion 11 along the length direction, and the second guiding plate 31 is attached to the second collecting portion 132.

In order to improve the insulation between the second guiding plate 31 and the main body portion 11, the second guiding plate 31 includes a substrate layer and an insulating layer, the insulating layer is attached to the side of the substrate layer adjacent to the second collecting portion 132, and the insulating layer is attached to the second collecting portion 132. For example, the insulating layer can be attached to the substrate layer by bonding. The substrate layer and the insulating layer of the second guide plate 31 can adopt a structure similar to FIG. 12.

Optionally, on the basis of ensuring the insulation between the second guiding plate 31 and the main body portion 11, the second guiding plate 31 includes a substrate layer, no insulating layer is attached to the substrate layer, and the substrate layer is directly attached to the second collecting portion 132.

In practice, although there may be gaps between the inner side of the first guiding plate 21 and the first collecting portion 122, and between the inner side of the second guiding plate 31 and the second collecting portion 132, after the tabs are bent in place, the outer sides of the tabs on the both sides of the main body portion 11 along the length direction will be clamped by using tools, so that both sides of the first guiding plate 21 are respectively attached to the negative tab 12 and the first collecting portion 122, and both sides of the second guiding plate 31 are respectively attached to the positive tab 13 and the second collecting portion 132. At the same time, under the action of a pressing force, the supporting plate 32 is also in contact with the second guiding plate 31, and the supporting plate 32 can be entirely attached to the second guiding plate 31, or the free end of the supporting plate 32 is attached to the second guiding plate 31.

For the structure connected with the guiding plate by singly bending the tab, if the laser welding is directly performed on each layer of tabs and the guiding plate after being folded back, since the pressure cannot be applied, the layers of tabs are difficult to be pressed, and void welding occurs, and furthermore, impurities are generated in the laser welding process easily; and moreover, after the layers of tabs are folded back, the supporting member cannot be provided, and then the ultrasonic welding cannot be adopted.

For this reason, the welding mode adopted by the present disclosure is as follows: firstly, the supporting member is arranged on the inner side of the tab, and the layers of tabs are ultrasonically welded into an entirety; secondly, the tab formed an entirety is bent to one side of the guiding plate away from the main body portion 11; and thirdly, the tab is fixedly connected with the guiding plate via laser welding.

In the present embodiments, the ultrasonic welding is employed firstly to apply the pressure to compress the layers of tabs so as to prevent void welding and improve the firmness of the layers of tabs after being welded, after the tabs are bent, the laser welding is performed between the tabs and the guiding plate to solve the problem that the supporting member cannot be arranged, furthermore, since the tabs have been formed an entirety by welding, the reliability of welding can also be ensured, and the generation of impurities can be reduced. This type of welding combines the advantages of ultrasonic welding and laser welding.

Figure 6:
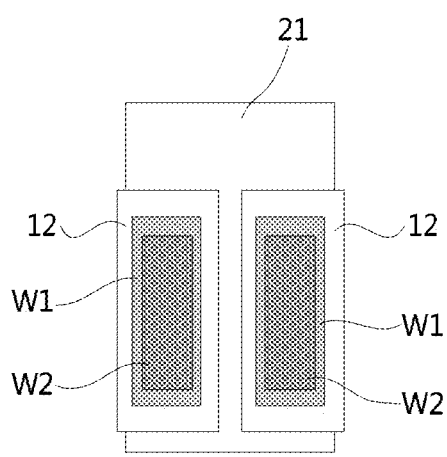
FIG. 6 is a schematic diagram of a fusion area for welding a tab in the battery unit of the present disclosure.

In some embodiments, as shown in FIG. 6, in a plane perpendicular to the length direction, the projection of a second fusion area W2 formed by the laser welding is completely located in a projection area of a first fusion area W1 formed by the ultrasonic welding. The fusion area can be of a rectangular or rectangular annular structure, or can be of circular, triangular or other polygonal structures. This structure can maximally avoid the generation of rosin joint and reduce the impurities generated in the laser welding process. Moreover, it is preferable that the first fusion area W1 is entirely located at a position beyond a bending area of the tab, which is conducive to the bending of the tab.

For the negative tab 12, as shown in FIG. 6, each layer of the first connecting portion 121 is integrally formed by ultrasonic welding and forms the first fusion area W1, the first connecting portion 121 and the first guiding plate 21 are fixed by the laser welding and form the second fusion area W2, and the first fusion area W1 entirely covers the second fusion area W2. For the positive tab 13, each layer of the second connecting portion 131 is integrally formed by the ultrasonic welding and forms the first fusion area W1, the second connecting portion 131 and the second guiding plate 31 are fixed by the laser welding and form the second fusion area W2, and in the plane perpendicular to the length direction, the projection of the second fusion area W2 is completely located in the projection area of the first fusion area W1.

Figure 7:
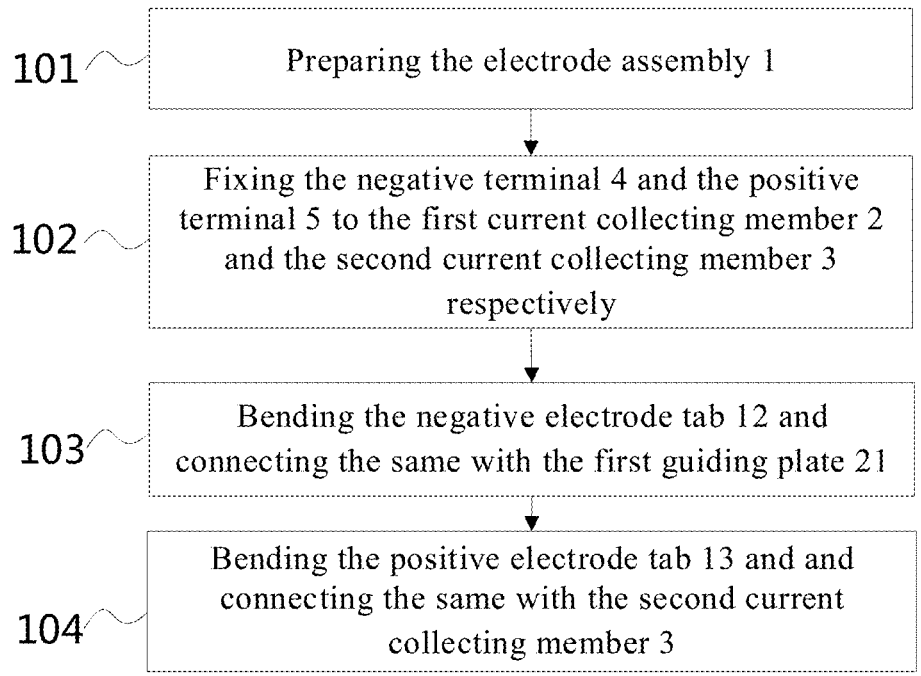
FIG. 7 is a schematic flow diagram of some embodiments of a manufacturing method of the battery unit of the present disclosure.

In addition, the present disclosure further provides a manufacturing method of the battery unit based on the above embodiments. In some embodiments, as shown in the schematic flow diagram in FIG. 7, the manufacturing method includes:

step 101, preparing the electrode assembly 1;

step 102, fixing the negative terminal 4 and the positive terminal 5 to the first current collector 2 and the second current collector 3 respectively;

step 103, bending the negative tab 12 and connecting the same with the first guiding plate 21, for example, fixedly connection by welding or the like; and step 104, bending the positive tab 13 and connecting the same with the second current collector 3, for example, fixedly connection by welding or the like.

Wherein the steps 101 and 102 are sequentially performed, the steps 103 and 104 are performed after the step 102, and the execution sequence of the steps 103 and 104 is not limited.

In the embodiments of the present disclosure, when the negative tab 12 is bent, the negative tab 12 with lower hardness is directly folded back and is connected to the first guiding plate 21, and the bending of the supporting plate is not involved, so that the external force to be applied in the bending process can be reduced, the deformation of the first guiding plate 21 of the first current collector 2 is reduced, the electrochemical performance and the safety performance of the battery unit are ensured, furthermore, the first guiding plate 21 is prevented from protruding outward, and the electrode assembly can be smoothly assembled in the shell.

Figure 8:
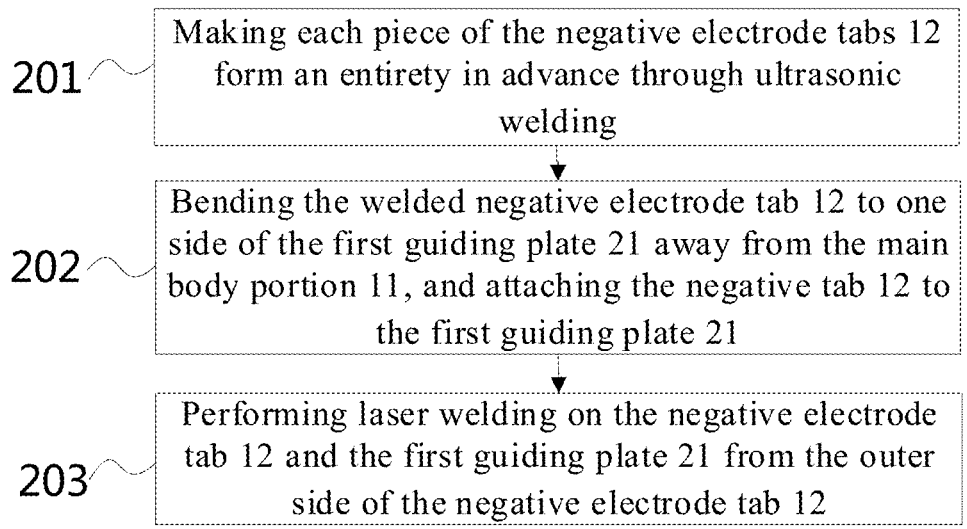
FIG. 8 is a schematic flow diagram of other embodiments of the manufacturing method of the battery unit of the present disclosure.

In some embodiments, as shown in the schematic flow diagram in FIG. 8, the step 103 of bending the negative tab 12 and connecting the same with the first guiding plate 21 specifically includes:

step 201, making each piece of the negative tabs 12 form an entirety in advance through ultrasonic welding on partial areas of the negative tabs 12, so as to form the first fusion area W1, wherein during the welding, the supporting member can be placed on the inner sides of the negative tabs 12 to apply pressures during the ultrasonic welding;

step 202, then bending the welded negative tab 12 to one side of the first guiding plate 21 away from the main body portion 11, and attaching the negative tab 12 to the first guiding plate 21; and step 203, performing laser welding on the negative tab 12 and the first guiding plate 21 from the outer side of the negative tab 12 to form a second fusion area W2, for example, the first fusion area W1 entirely covers the second fusion area W2.

The steps 201 to 203 are sequentially performed. In the present embodiments, the ultrasonic welding is employed firstly to apply the pressure to compress the layers of tabs, so as to prevent void welding and improve the firmness of the layers of tabs after being welded, after the tabs are bent, the laser welding is performed between the tabs and the guiding plate to solve the problem that the supporting member cannot be arranged, furthermore, since the tabs have been welded into the entirety, the reliability after welding can also be ensured, the generation of impurities can be reduced, and the welding quality is optimized.

Figure 9:
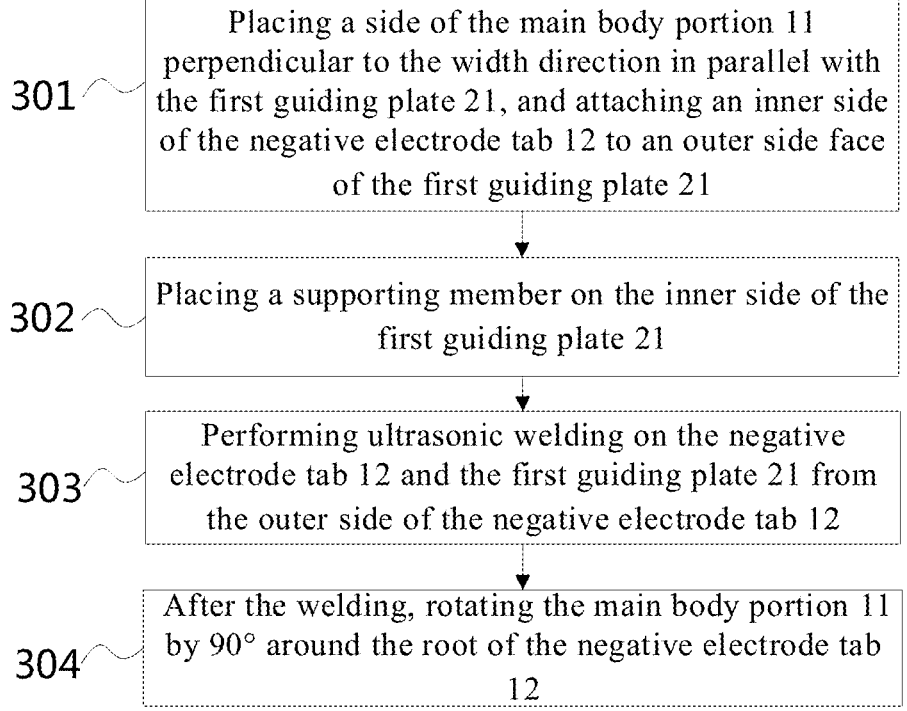
FIG. 9 is a schematic flow diagram of other embodiments of the manufacturing method of the battery unit of the present disclosure.

In some other embodiments, as shown in the schematic flow diagram in FIG. 9, the step 103 of bending the negative tab 12 and connecting the same with the first guiding plate 21 specifically includes:

step 301, placing a side of the main body portion 11 perpendicular to the width direction in parallel with the first guiding plate 21, and attaching an inner side of the negative tab 12 with an outer side of the first guiding plate 21, for example, the first guiding plate 21 can be in a vertical state;

step 302, placing a supporting member on the inner side of the first guiding plate 21, for example, a cushion block or the like;

step 303, performing ultrasonic welding on the negative tab 12 and the first guiding plate 21 from the outer side of the negative tab 12; and step 304, after the welding, rotating the main body portion 11 by 90° around the root of the negative tab 12 to bend the negative tab 12.

The steps 301 to 304 are sequentially performed. In the welding process through the step 303, assisted limiting can be performed on the main body portion 11 to prevent the main body portion 11 from shifting to affect the welding effect.

In the present embodiments, the negative tab 12 and the first guiding plate 21 can be directly ultrasonically welded, the negative tab 12 is bent by rotating the main body portion 11, the welding firmness can be improved by applying the pressure so as to prevent the void welding, and the generation of impurities can also be reduced. With FIG. 2 as an example, all tabs are ultrasonically welded, so that the requirements on the type of welding equipment can be reduced, the process flow is simplified, and the welding efficiency is improved.

Figure 10:
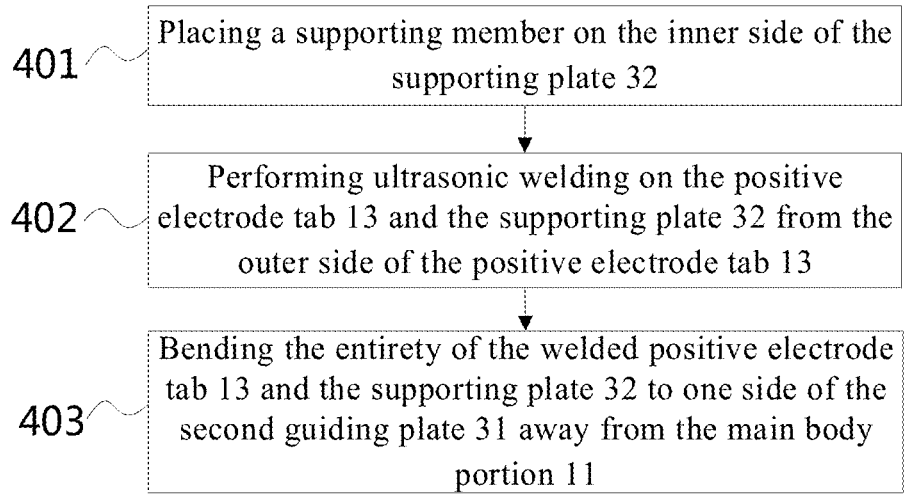
FIG. 10 is a schematic flow diagram of other embodiments of the manufacturing method of the battery unit of the present disclosure.

In some embodiments, as shown in FIG. 2, the second current collector 3 includes a second guiding plate 31 and a supporting plate 32, and the supporting plate 32 is connected to the end of the second guiding plate 31 along the width direction. As shown in the schematic flow diagram in FIG. 10, the step 104 of bending the positive tab 13 and connecting the same with the second current collector 3 specifically includes:

step 401, placing a supporting member on the inner side of the supporting plate 32 to provide a supporting force for the ultrasonic welding;

step 402, performing ultrasonic welding on the positive tab 13 and the supporting plate 32 from the outer side of the positive tab 13; and step 403, bending the entirety of the welded positive tab 13 and the supporting plate 32 to one side of the second guiding plate 31 away from the main body portion 11.

Wherein the steps 401 to 403 are sequentially executed. The present embodiment is suitable for welding the positive tab 13 provided with the supporting plate 32, the supporting plate 32 and the second guide plate 31 form an L-shaped structure, a space for placing the supporting member is formed before the bending, thereby being suitable for the ultrasonic welding, and by applying the pressure, the welding firmness can be improved, the void welding can be prevented, and the generation of impurities can also be reduced.

For the structure in FIG. 2, if the negative tab 12 and the first guiding plate 21 are ultrasonically welded, the positive tab 13 and the supporting plate 32 are also ultrasonically welded, since the rotation of the main body portion 11 is involved in the ultrasonic welding process of the negative tab 12 and the first guiding plate 21, the welding step of the negative tab 12 should be executed before the welding step of the positive tab 13.

If the layers of the negative tab 12 are integrally formed by the ultrasonic welding, and then are bent and laser welded with the first guiding plate 21, the positive tab 13 and the supporting plate 32 are also ultrasonically welded, then the welding sequence of the negative tab 12 and the positive tab 13 is not limited. In the present application, by adoption of a direct welding structure of the tab and the guiding plate, the welding flexibility of the tabs can be improved, and the main body portion 11 does not need to be rotated in the welding process, thereby reducing the operation difficulty.

In some other embodiments, the second current collector 3 includes a second guiding plate 31, the positive tab 13 is of a flat plate structure, the positive tab 13 is bent to one side of the second guiding plate 31 away from the main body portion 11 and is fixedly connected with the second guiding plate 31, that is, neither the first current collector 2 nor the second current collector 3 is provided with the supporting plate.

For this structure, two welding modes are available:

Firstly, laser welding is performed between the negative tab 12 and the first guiding plate 21 and between the positive tab 13 and the second guiding plate 31, and the negative tabs 12 or positive tabs 13 still need to be welded into an entirety before the laser welding.

Secondly, the laser welding is performed on one of the location between the negative tab 12 and the first guiding plate 21 and between the positive tab 13 and the second guiding plate 31, the ultrasonic welding is performed on the other one. Since the ultrasonic welding involves the rotation of the main body portion 11, the ultrasonic welding is performed before the laser welding.

In some embodiments, a device using a secondary battery is also provided in the present disclosure, and the battery includes the battery unit of the above embodiments. The device using secondary battery can include vehicle, ship, drone, etc. Since the energy density of the battery unit can be improved; and the electrochemical performance and safety performance of the battery unit can be ensured, so that the power performance and reliability of the device can be improved.

The battery unit, the manufacturing method thereof and the battery module provided by the present disclosure are described in detail above. The principles and the embodiments of the present disclosure have been described herein by using specific embodiments, and the description of the above embodiments is only used for assisting to understand the method of the present disclosure and its core idea. It should be noted that those of ordinary skill in the art can make several improvements and modifications to the present disclosure without departing from the principles of the present disclosure, and these improvements and modifications shall also fall within the protection scope of the claims of the present disclosure.

The invention claimed is:

1. A battery unit, comprising:
    an electrode assembly, comprising a main body portion, a negative tab and a positive tab, wherein the negative tab and the positive tab respectively extend out from both ends of the main body portion along a length direction of the electrode assembly;
    a negative terminal and a positive terminal, arranged at the top of the electrode assembly; and
    a first current collector and a second current collector, wherein the first current collector electrically connects the negative tab with the negative terminal, and the second current collector electrically connects the positive tab with the positive terminal;
    wherein the first current collector comprises a first guiding plate, the first guiding plate is of a flat plate structure, and is provided with no bending structure at both ends along a width direction of the electrode assembly, the first guiding plate is located on one side of the main body portion adjacent to the negative terminal along the length direction and extends along the width direction of the electrode assembly, and the negative tab is singly bent to one side of the first guiding plate away from the main body portion and is connected with the first guiding plate.

2. The battery unit according to claim 1, comprising two electrode assemblies, wherein the negative tab of one electrode assembly is led out from one side of the main body portion away from the other electrode assembly along the width direction, and the negative tabs of the two electrode assemblies are bent towards each other along the width direction.

3. The battery unit according to claim 1, wherein the second current collector comprises a second guiding plate, the second guiding plate is of a flat plate structure, the second guiding plate is located on one side of the main body portion adjacent to the positive terminal along the length direction and extends along the width direction, and the positive tab is bent to one side of the second guiding plate away from the main body portion and is connected with the second guiding plate.

4. The battery unit according to claim 1, wherein the second current collector comprises a second guiding plate and a supporting plate, the second guiding plate is located on one side of the main body portion adjacent to the positive terminal along the length direction and extends along the width direction, the supporting plate is connected to an end of the second guiding plate along the width direction, and the positive tab is connected to the supporting plate from the outer side and is entirely bent to one side of the second guiding plate away from the main body portion.

5. The battery unit according to claim 4, wherein supporting plates are arranged on both ends of the second guiding plate along the width direction, and the two supporting plates are bent towards each other.

6. The battery unit according to claim 4, wherein,
the supporting plate offsets inward for a predetermined distance with respect to the edge of the end of the second guiding plate along the width direction; and/or
the edge of a free end of at least one of the first guiding plate and the second guiding plate along the width direction offsets inward for a predetermined distance on at least partial height, so as to form a first notch, and the negative tab or the positive tab passes through the first notch.

7. The battery unit according to claim 4, wherein the second current collector further comprises a second adapter plate, the positive terminal is fixed to the second adapter plate, a side of the supporting plate adjacent to the second adapter plate and the second adapter plate are arranged at intervals, and a second notch is formed at an end of a connection portion of the second guiding plate and the supporting plate adjacent to the second adapter plate.

8. The battery unit according to claim 1, wherein both of the negative tab and the positive tab are of layered structures; and the negative tab comprises a first connecting portion and a first collecting portion, the first connecting portion is located on one side of the first guiding plate away from the main body portion along the length direction and is connected to the first guiding plate, the first collecting portion is located on one side of the first guiding plate adjacent to the main body portion along the length direction, and the first guiding plate is attached to the first collecting portion.

9. The battery unit according to claim 8, wherein,
the first guiding plate comprises a substrate layer, and the substrate layer is attached to the first collecting portion; or
the first guiding plate comprises a substrate layer and an insulating layer, the insulating layer is attached to one side of the substrate layer adjacent to the first collecting portion, and the insulating layer is attached to the first collecting portion.

10. The battery unit according to claim 8, wherein each layer of the first connecting portion is integrally formed by ultrasonic welding and forms a first fusion area, the first connecting portion and the first guiding plate are fixed by laser welding and form a second fusion area, in a plane perpendicular to the length direction, and the projection of the second fusion area is completely located in a projection area of the first fusion area.

11. The battery unit according to claim 1, wherein the hardness of the first current collector is greater than the hardness of the second current collector.

12. A battery module, comprising:
a fixing frame; and
a plurality of battery units according to claim 1, arranged in the fixing frame and arranged side by side along the width direction.

13. A manufacturing method of the battery unit according to claim 1, comprising:
preparing the electrode assembly;
fixing the negative terminal and the positive terminal to the first current collector and the second current collector respectively;
bending the negative tab and connecting the same with the first guiding plate; and
bending the positive tab and connecting the same with the second current collector.

14. The manufacturing method of the battery unit according to claim 13, wherein,
the step of bending the negative tab and connecting the same with the first guiding plate comprises:
making each piece of the negative tabs form an entirety through ultrasonic welding;
bending the welded negative tab to one side of the first guiding plate away from the main body portion, and attaching the negative tab to the first guiding plate; and
performing laser welding on the negative tab and the first guiding plate from the outer side of the negative tab.

15. The manufacturing method of the battery unit according to claim 13, wherein the step of bending the negative tab and connecting the same with the first guiding plate comprises:
placing a side of the main body portion perpendicular to the width direction in parallel with the first guiding plate, and attaching an inner side of the negative tab to an outer side of the first guiding plate;
placing a supporting member on the inner side of the first guiding plate;
performing ultrasonic welding on the negative tab and the first guiding plate from the outer side of the negative tab; and
rotating the main body portion by 90° around the root of the negative tab to bend the negative tab after welding.

16. The manufacturing method of the battery unit according to claim 13, wherein the second current collector comprises a second guiding plate and a supporting plate, the supporting plate is connected to the end of the second guiding plate along the width direction, and the step of bending the positive tab and connecting the same with the second current collector comprises:
placing a supporting member on the inner side of the supporting plate;
performing ultrasonic welding on the positive tab and the supporting plate from the outer side of the positive tab; and
bending the entirety of the welded positive tab and the supporting plate to one side of the second guiding plate away from the main body portion.

17. The manufacturing method of the battery unit according to claim 16, wherein the negative tab and the first guiding plate are ultrasonically welded, and the welding step of the negative tab is performed before the welding step of the positive tab.

18. The manufacturing method of the battery unit according to claim 13, wherein the second current collector comprises a second guiding plate, the positive tab is of a flat plate structure, and the positive tab is bent to one side of the second guiding plate away from the main body portion and is fixedly connected with the second guiding plate;
laser welding is performed between the negative tab and the first guiding plate and between the positive tab and the second guiding plate; or
the laser welding is performed on one of the locations between the negative tab and the first guiding plate and between the positive tab and the second guiding plate, the ultrasonic welding is performed on the other one, and the ultrasonic welding is performed before the laser welding.

* * * * *